(12) United States Patent
Huang

(10) Patent No.: US 8,395,285 B2
(45) Date of Patent: Mar. 12, 2013

(54) ELECTROMAGNETIC VIBRATION DEVICE AND MANUFACTURING METHOD THEREOF

(76) Inventor: Hsin Min Huang, Ningbo (CN)

( * ) Notice: Subject to any disclaimer, the term of this patent is extended or adjusted under 35 U.S.C. 154(b) by 380 days.

(21) Appl. No.: 12/735,940

(22) PCT Filed: Dec. 15, 2008

(86) PCT No.: PCT/CN2008/073507
§ 371 (c)(1),
(2), (4) Date: Aug. 25, 2010

(87) PCT Pub. No.: WO2009/092232
PCT Pub. Date: Jul. 30, 2009

(65) Prior Publication Data
US 2011/0043056 A1    Feb. 24, 2011

(30) Foreign Application Priority Data
Dec. 27, 2007    (CN) .......................... 2007 1 0308018

(51) Int. Cl.
*H02K 35/04* (2006.01)
*H02K 1/04* (2006.01)
*H02K 3/30* (2006.01)
*H02K 33/00* (2006.01)
*H02K 35/00* (2006.01)

(52) U.S. Cl. ......... 310/12.16; 310/15; 310/194; 310/71; 381/400; 381/401; 381/407; 381/433

(58) Field of Classification Search ............... 310/12.16, 310/194, 15; 318/400, 396, 401, 407, 409, 318/410, 433; H02K 35/04, 1/04, 33/00, H02K 35/00
See application file for complete search history.

(56) References Cited

U.S. PATENT DOCUMENTS

| | | | | |
|---|---|---|---|---|
| 6,111,969 A * | 8/2000 | Babb | ............................. | 381/396 |
| 6,327,371 B1 * | 12/2001 | Proni | ............................. | 381/397 |
| 7,835,538 B2 * | 11/2010 | Inoue et al. | ................... | 381/423 |
| 2001/0017928 A1 * | 8/2001 | Sugiyama et al. | ............. | 381/396 |
| 2006/0133640 A1 * | 6/2006 | Proni | ............................. | 381/433 |
| 2007/0041607 A1 * | 2/2007 | Abe | ............................. | 381/423 |
| 2008/0013779 A1 * | 1/2008 | Linn et al. | ..................... | 381/396 |

* cited by examiner

*Primary Examiner* — Tran N. Nguyen
*Assistant Examiner* — Terrance Kenerly
(74) *Attorney, Agent, or Firm* — Raymond Y. Chan; David and Raymond Patent Firm

(57) ABSTRACT

An electromagnetic vibration device includes a vibrating plate, a suspending frame, upper and lower basin frames, a voice coil, and a magnetic loop system. Multiple voice coil fixing slots are uniformly distributed on the circumference of the vibrating plate corresponding to the inserting pieces of the voice coil, and the inserting pieces are passed through the voice coil fixing slots of the vibrating plate and fixed to the vibrating plate. One end of the lead of the voice coil is embedded in a groove on back of the vibrating plate and connected to the terminal of the lower basin frame.

6 Claims, 3 Drawing Sheets

ELECTROMAGNETIC VIBRATION DEVICE AND MANUFACTURING METHOD THEREOF

BACKGROUND OF THE PRESENT INVENTION

1. Field of Invention

The present invention relates to a vibration device, more particularly to an electromagnetic vibration device which is adapted for producing mechanical vibrations by means of electromagnetic force, wherein the structure of the electromagnetic vibration device is similar to the structure of the electromagnetic vibrator of the present loudspeaker.

2. Description of Related Arts

The applicant has submitted a patent application entitled with "electromagnetic vibration device" which comprises a vibration member, a suspension element, a basin frame and a magnetic coil system. A voice coil is coupled at the rear side of the vibration member and is disposed within the magnetic coil system. The circumferential edge of the vibration member is integrally formed with the suspension element to form a one piece integrated structure. The lead wire of the voice coil is fixed at the vibration member to electrically couple with the terminal at the basin frame. For manufacturing the electromagnetic vibration device, the rear side of the vibration member is affixed to the voice coil by adhesive, wherein one end of the conductive wire is electrically coupled with the lead wire of the voice coil through the vibration member while another end of the conductive wire is electrically coupled to the terminal at the basin frame.

The aforesaid structure enables the elimination of glue to manufacture the vibration member, or using minimum glue in the non-critical step of manufacturing the vibration member, and instead, the preparing procedure is accomplished in a manufacturing machine which incorporates the art of injection molding, ultrasonic welding, supersonic welding and hot melting. Therefore, human errors can be minimized during the manufacturing process to ensure the uniformity and stability of the vibration member. The connection between the vibration member and the basin frame brings an unexpected result to overcome the disadvantage of the traditional art of the loudspeakers. And the inventor herein creatively introduces ultrasonic welding and hot melting to take place of gluing so as to overcome the disadvantages caused by the gluing attachment between the vibration member and the suspension element, therefore, the quality and acceptance rate of the product is enhanced and the cost is reduced.

But the vibration member is stilled glued to the voice coil according to the above electromagnetic vibration device. Generally, the glue is made of polar material that is easily oxidized after a long period of usage, and then the properties of the glue will hard to meet the requirement for bonding and a slipping may take place. Furthermore, the gluing process is often carried out in a manual manner so that the procedure is very complicated and it is really hard to control the proper amount of the glue. So the uniformity and stability of the weight of the vibration member can not be ensured, and thus the quality of the product can not be guaranteed.

A loudspeaker which incorporates this kind of connection manner between the vibration member and the voice coil also has the following drawback. When a relatively high power is input into the loudspeaker, the vibration member may slip from the voice coil because of intense vibration. All these disadvantages limit the application of the electromagnetic vibration device according to the above invention.

SUMMARY OF THE PRESENT INVENTION

An object of the present invention is to provide an electromagnetic vibration device which has enhanced stability and uniformity.

Another object of the present invention is to provide a method of manufacturing an electromagnetic vibration device wherein the manufacturing process is more convenient and the acceptance rate of the products are improved.

Additional advantages and features of the invention will become apparent from the description which follows, and may be realized by means of the instrumentalities and combinations particular point out in the appended claims.

According to the present invention, the foregoing and other objects and advantages are attained by providing an electromagnetic vibration device which comprises an upper basin frame, a lower basin frame coupling with the upper basin frame, a vibration member having a plurality of retaining slots, a suspension element extending between the vibration member and the upper basin frame, a voice coil which comprises a plurality of corresponding inserting members slidably passing through the retaining slots, wherein each of the inserting members has an upper bending portion arranged in such a manner that after the inserting member passes through the respective retaining slot, the upper bending portion of the inserting member is bent to interlock the voice coil with the vibration member.

The vibration member has at least a groove indently formed at a rear side thereof, wherein a lead wire of the voice coil is embedded in the groove to electrically couple with a terminal at the lower basin frame.

Accordingly, the vibration member, the upper basin frame and the lower basin frame are manufactured by injection molding respectively.

The vibration member, the suspension element, and the upper basin frame are integrally coupled together by embedded injection molding.

The operation of the electromagnetic vibration device of the present invention is similar to a magnetic assembly of a loudspeaker, wherein when a sinusoidal wave signal is input, the electromagnetic vibration device will correspondingly vibrating in up and down motion. And when inputting a constant sinusoidal wave signal whose frequency is just the natural resonance frequency of the electromagnetic vibration device, the electromagnetic vibration device is capable of producing maximize vibration under a relatively low power supply.

The present invention further provides a method of manufacturing the above mentioned electromagnetic vibration device, wherein the method comprises the following steps.

(1) Provide a vibration member by injection molding, wherein a plurality of retaining slots are integrally formed at the vibration member for a plurality of inserting members of a voice coil slidably inserting therethrough respectively.

(2) Place the vibration member and an upper basin frame in a mold, wherein during a suspension element mold injection process, a suspension element is integrally formed between the vibration member and the upper basin frame to form a one piece integrated vibration arrangement.

(3) Bond the vibration arrangement to a lower basin frame by one of a bonding process selected by the group consisting of ultrasonic welding, supersonic welding, and hot melting;

(4) Slidably insert the inserting members of the voice coil through the retaining slots of the vibration member respectively, bending upper bending portions of the inserting members to interlock the vibration member with the voice coil, guiding a lead wire of the voice coil to couple along a groove at a rear side of the vibration member so as to embed the lead wire of the voice coil at the rear side of the vibration member along the groove, and electrically coupling the lead wire with a terminal at the lower basin frame; and (5) Couple a magnetic circuit system at the lower basin frame to magnetically induce with the voice coil.

Accordingly, the present invention has the following advantages.

1. Since the voice coil is glued to the vibration member in the traditional art, the vibration member is intensely vibrating corresponding to a relatively high power input. Therefore, the voice coil will easily slip from the vibration member or the cone paper. The present invention introduces a special inserting-bonding manner so that the voice coil and the vibration member are firmly fixed to each other, and the manufacturing method employs a compressing process rather than gluing. Therefore, the present invention eliminates the use of glue and successfully prevents the unwanted slipping movement of the vibration member because of oxidization of the glue after a long period of usage. Besides, the amount of glue will directly affect the resonance frequency of the vibration member, and thus errors cannot be avoided no matter machine gluing or man-made gluing when a small amount of glue is required. But the present invention overcomes the disadvantages and the quality and the acceptance rate of the products are enhanced, whilst the manufacturing method is easy, convenient and fast to operate so that the cost is reduced.

2. The electric conducting strip is eliminated and the weight of the vibration member can be directly adjusted so that it is convenient for preparing as well as convenient for adjusting the inherent frequency of the electromagnetic vibration device.

It is worth to mention that because of all of the advantages such as free adjustment of the volume, efficient vibration, stable property, good uniformity and low cost, the electromagnetic vibration device of the present invention can be applied to various devices which produce vibrations by means of electromagnetic force such as heat radiators, loudspeakers and so on.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
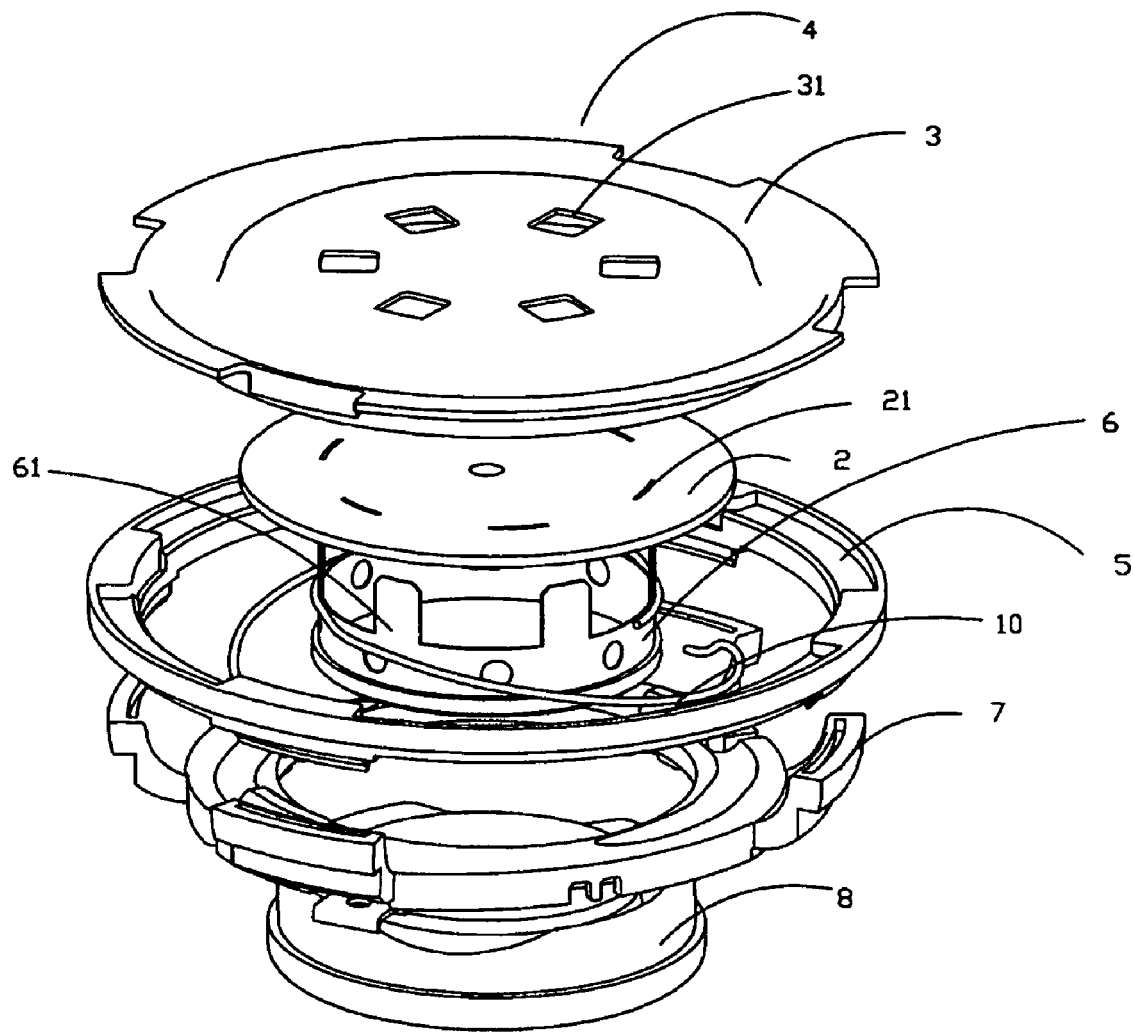
FIG. 1 is an exploded perspective view of an electromagnetic vibration device according to a preferred embodiment of the present invention.
Figure 2:
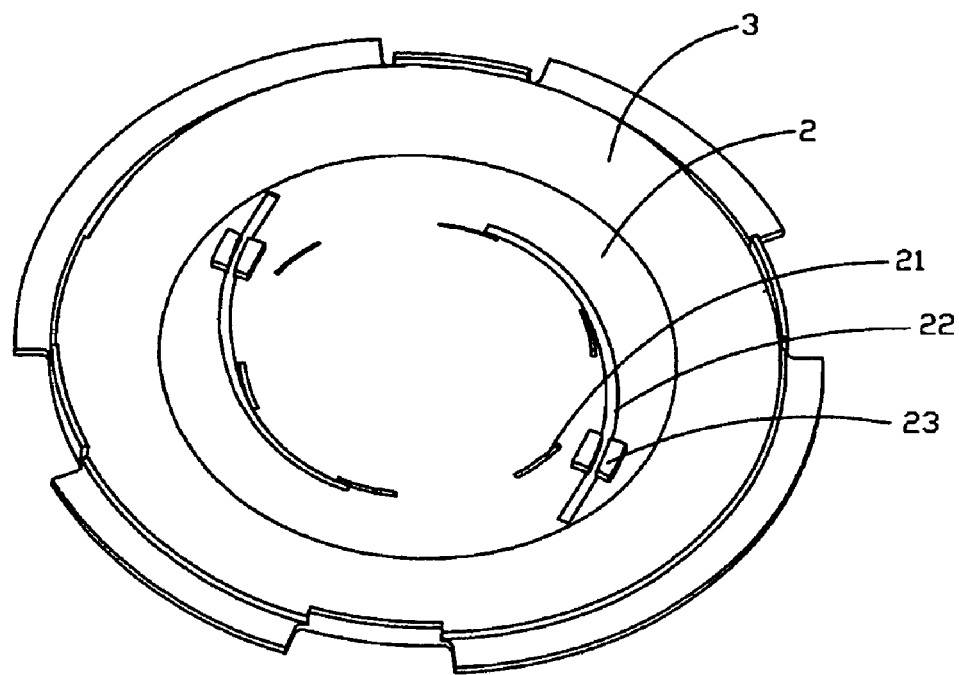
FIG. 2 is a rear view of the vibration member and the suspension element of the electromagnetic vibration device according to the above preferred embodiment of the present invention.
Figure 3:
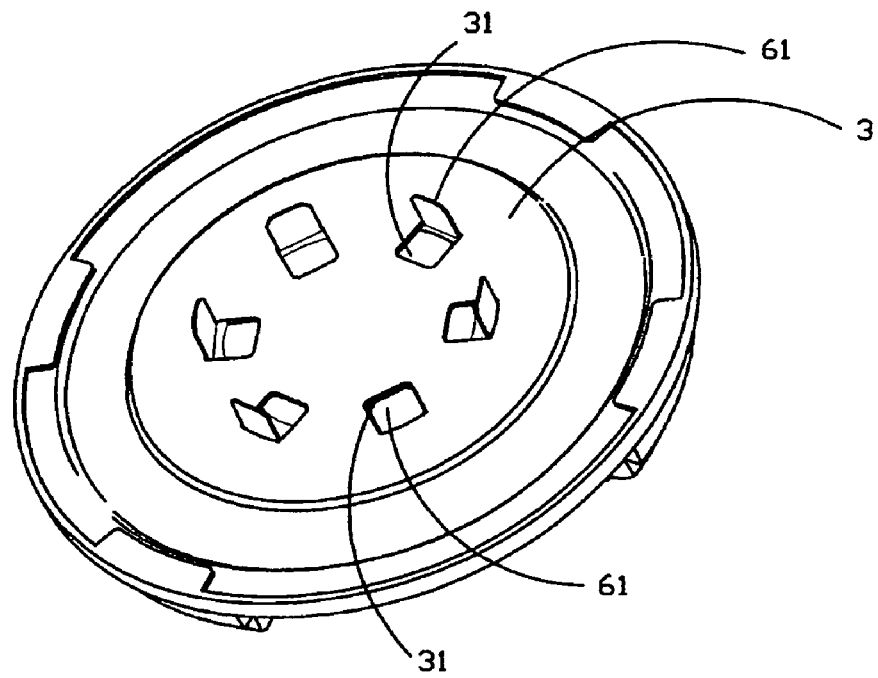
FIG. 3 is a schematic view illustrating the connection among the suspension element, the vibration member and the voice coil of the electromagnetic vibration device according to the above preferred embodiment of the present invention.

Referring to FIG. 1 of the drawings, an electromagnetic vibration device according to a first preferred embodiment of the present invention is illustrated, wherein the electromagnetic vibration device comprises a vibration member 2, a voice coil 6, a suspension element 3, an upper basin frame 5 a lower basin frame 7, a magnetic circuit system 8 supported by the lower basin frame 7. The vibration member 2 has a plurality of retaining slots 21, preferably six retaining slots 21, spacedly provided along the circumference thereof. Correspondingly, the voice coil 6 comprises a plurality of inserting members 61, preferably six inserting members 61, spacedly protruding therefrom to pass through the retaining slots 21 of the vibration member 2 respectively, as shown in FIG. 3. Each of the inserting members 61 has an upper bending portion arranged in such a manner that after the inserting member 61 is slidably inserted into the respective retaining slot 21, the upper bending portion of the inserting member 61 is bent to interlock the vibration member 2 with the voice coil 6. Accordingly, the suspension element 3 is radially and outwardly extended from the vibration member 2 that an inner circumferential edge of the suspension element 3 is overlapped with an outer circumferential edge of the vibration member 2 to define an overlapped portion having a plurality of receiving slots 31, preferably six receiving slots 31, spacedly provided thereat, wherein the bent upper bending portions of the inserting members 61 are received at and embedded within the receiving slots 31 respectively. As shown in FIG. 3, the suspension element 3 is engaged with the upper basin frame 5 while the upper basin frame 5 is engaged with the lower basin frame 7.

The vibration member 2 has at least a groove 22 indently formed at the rear side thereof, wherein the lead wire 10 of the voice coil 6 is embedded in the groove 22. Accordingly, the vibration member 2 further comprises two guiders 23 provided at the rear side thereof at a position that the groove 22 is extended between the guiders 23 to securely retain the lead wire 10 within the groove 22 between the guiders 23.

Accordingly, another end of the lead wire 10 of the voice coil 6 is retained at the terminal of the lower basin frame 7.

Figure 4:
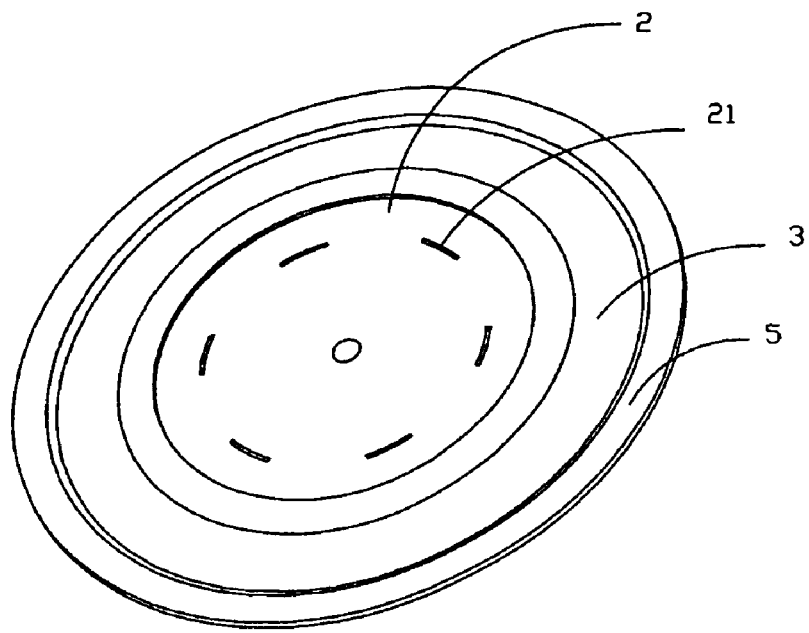
FIG. 4 illustrates an alternative mode of the connection between the suspension element and the vibration member of the electromagnetic vibration device according to the above preferred embodiment of the present invention.

FIG. 4 illustrates an alternative mode of the electromagnetic vibration device, wherein the suspension element 3 has a ring shaped structure. The inner circumferential edge of the suspension element 3 is extended from the outer circumferential edge of the vibration member 2. In other words, the overlapped portion of the suspension element 3 is eliminated such that when the suspension element 3 is engaged with the vibration member 2, the outer surface of the vibration member 2 is exposed.

Figure 5:
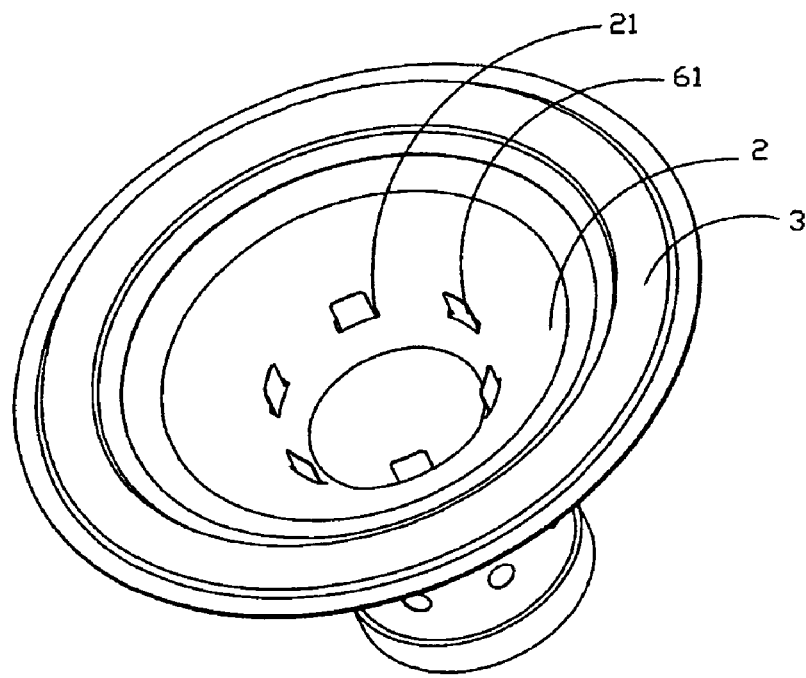
FIG. 5 illustrates an alternative mode of the vibration member of the electromagnetic vibration device to incorporate with a loudspeaker according to the above preferred embodiment of the present invention.

FIG. 5 illustrates another alternative mode that the vibration member 2 is constructed to be taper shaped or arc shaped, so that the electromagnetic vibration device is adapted for incorporating into a loudspeaker.

It is worth to mention that the vibration member 2 and the suspension element 3 are integrally formed to form a one piece integrated structure by injection molding so as to eliminate the glue bonding step.

In addition, the vibration member 2, the suspension element 3 and the upper basin frame 5 are integrally formed to form a one piece integrated structure by injection molding so as to eliminate the glue bonding step.

The present invention further provides a method for manufacturing the electromagnetic vibration device which is shown in FIG. 1, wherein the method comprises the following steps.

(1) Provide a vibration member 2 by injection molding, wherein the retaining slots 21 are integrally formed at the vibration member 2 for the inserting members 61 of the voice coil 6 slidably inserting therethrough respectively.

(2) Place the vibration member 2 and the upper basin frame 5 in a mold, wherein during the suspension element mold injection process, the suspension element 3 is formed that the vibration member 2 is completely coated and wrapped by the suspension element 3 while the suspension element 3 is integrally coupled with the upper basin frame 5 to form a one piece integrated vibration arrangement 4. In other words, the suspension element 3 is integrally extended between the vibration member 2 and the upper basin frame 5 during the formation of the suspension element 3.

(3) Bond the vibration arrangement 4 to the lower basin frame 7 by a bonding process which is one of ultrasonic welding, supersonic welding, and hot melting.

(4) Slidably insert the inserting members 61 of the voice coil 6 through the retaining slots 21 of the vibration member 2 respectively, and bend the upper bending portion of the inserting members 61 to receive in the receiving slots 31 respectively so as to interlock the vibration member 2 with the voice coil 6. Then, guide the lead wire 10 of the voice coil 6 to couple along the groove 22 at the rear side of the vibration member 2 so as to embed the lead wire 10 of the voice coil 6 at the rear side of the vibration member 2 along the groove 22. The lead wire 10 is then electrically coupled with the terminal at the lower basin frame 7.

(5) Couple the magnetic circuit system 8 at the lower basin frame 7 to magnetically induce with the voice coil 6.

Alternatively, the vibration arrangement 4 as shown in FIG. 1 can be modified to have a structure as shown in FIG. 4, wherein the method of manufacturing other components of the electromagnetic vibration device is the same as mentioned above expect the step (2). In the step (2), the vibration member 2 and the upper basin frame are placed in the mold, wherein during the suspension element mold injection process, the suspension element 3 is formed that the suspension element 3 is integrally extended from the outer circumferential edge of the vibration member 2 to integrally couple with the upper basin frame 5 to form a one piece integrated vibration arrangement 4. In other words, the suspension element 3 is coated and wrapped at the outer circumferential edge of the vibration member 2.

Furthermore, the engagement between the vibration member 2 and the voice coil 6 of the present invention can be incorporated into a loudspeaker, wherein the manufacturing method of the loudspeaker comprises the following steps.

(1) Form a plurality of retaining holes 21 along the circumference of the vibration member 2 of a traditional loudspeaker for the inserting members 61 of a voice coil 6 slidably engaging therewith respectively, wherein the vibration member 2 can be configured to have a taper shape, arc shape, horn shape or other shapes of the traditional loudspeaker (as is called a loudspeaker cone paper);

(2) Bond the vibration member 2 with the suspension element 3 by ultrasonic welding or gluing.

(3) Guide each of the inserting members 61 to pass through the corresponding retaining hole 21 of the vibration member 2 and bend the upper bending portion of the inserting members 61 to interlock the vibration member 2 with the voice coil 6.

Since the manufacturing method of other components of the loudspeaker is similar to the prior art, detailed description thereof will be omitted.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electromagnetic vibration device, comprising an upper basin frame, a lower basin frame coupling with said upper basin frame, a vibration member having a plurality of retaining slots, a suspension element extending between said vibration member and said upper basin frame, a voice coil which comprises a plurality of corresponding inserting members slidably passing through said retaining slots, wherein each of said inserting members has an upper bending portion arranged in such a manner that after said inserting member passes through said respective retaining slot, said upper bending portion of said inserting member is bent to interlock said voice coil with said vibration member.

2. The electromagnetic vibration device, as recited in claim 1, wherein said suspension element is radially and outwardly extended from said vibration member that an inner circumferential edge of said suspension element is overlapped with an outer circumferential edge of said vibration member to define an overlapped portion having a plurality of receiving slots thereat, wherein said upper bending portions of said inserting members are bent to receive at said receiving slots respectively.

3. The electromagnetic vibration device, as in claim 1 or 2, wherein said vibration member has at least a groove indently formed at a rear side thereof, wherein a lead wire of said voice coil is embedded in said groove to electrically couple with a terminal at said lower basin frame.

4. The electromagnetic vibration device, as in claim 1 or 2, wherein said suspension element is integrally extended between said vibration member and said upper basin frame during a suspension element mold injection process.

5. The electromagnetic vibration device, as recited in claim 3, wherein said suspension element is integrally extended between said vibration member and said upper basin frame during a suspension element mold injection process.

6. A method for manufacturing an electromagnetic vibration device, comprising the steps of:
(a) providing a vibration member by injection molding, wherein a plurality of retaining slots are integrally formed at said vibration member for a plurality of inserting members of a voice coil slidably inserting therethrough respectively;
(b) placing said vibration member and an upper basin frame in a mold, wherein during a suspension element mold injection process, a suspension element is integrally formed between said vibration member and said upper basin frame to form a one piece integrated vibration arrangement;
(c) bonding said vibration arrangement to a lower basin frame by one of a bonding process selected by the group consisting of ultrasonic welding, supersonic welding, and hot melting;

(d) slidably inserting said inserting members of said voice coil through said retaining slots of said vibration member respectively, bending upper bending portions of said inserting members to interlock said vibration member with said voice coil, guiding a lead wire of said voice coil to couple along a groove at a rear side of said vibration member so as to embed said lead wire of said voice coil at said rear side of said vibration member along said groove, and electrically coupling said lead wire with a terminal at said lower basin frame; and (e) coupling a magnetic circuit system at said lower basin frame to magnetically induce with said voice coil.

* * * * *